United States Patent [19]

Laverty, Jr.

[11] Patent Number: 4,872,485

[45] Date of Patent: Oct. 10, 1989

[54] SENSOR OPERATED WATER FLOW CONTROL

[75] Inventor: Martin J. Laverty, Jr., Earlysville, Va.

[73] Assignee: Coyne & Delany Co., Charlottesville, Va.

[21] Appl. No.: 137,065

[22] Filed: Dec. 23, 1987

[51] Int. Cl.$^4$ ............................................. F16K 31/02
[52] U.S. Cl. ........................... 137/624.11; 251/129.04; 251/129.15; 4/623
[58] Field of Search ...................... 251/129.04, 129.15; 4/623; 137/624.11

[56] References Cited

U.S. PATENT DOCUMENTS 4,682,628  7/1987  Hill .................................. 137/624.11
4,716,605  1/1988  Shepherd et al. ....................... 4/623

FOREIGN PATENT DOCUMENTS 1416262  12/1975  United Kingdom ........... 251/129.04

Primary Examiner—Arnold Rosenthal
Attorney, Agent, or Firm—McAulay Fisher Nissen & Goldberg

[57] ABSTRACT

A sensor activated unit, e.g., a drinking fountain or a wash basin, for preventing unwanted operation. The sensor has a power on reset circuit that makes use of a resistor capacitor network and a voltage threshold comparing device to create a time delay that will inhibit the operation of the unit for a nominal predetermined time period when current is first supplied to the sensor. The sensor does not activate until a user steps up to the unit and is within a preset range or distance from the unit. Use is made of an infrared sensor for controlling the operation of the unit. Circuitry is provided to control the time of commencement of the operation of the unit, the time period duration of operation, and down time of the unit before it is readied for operation again.

14 Claims, 7 Drawing Sheets

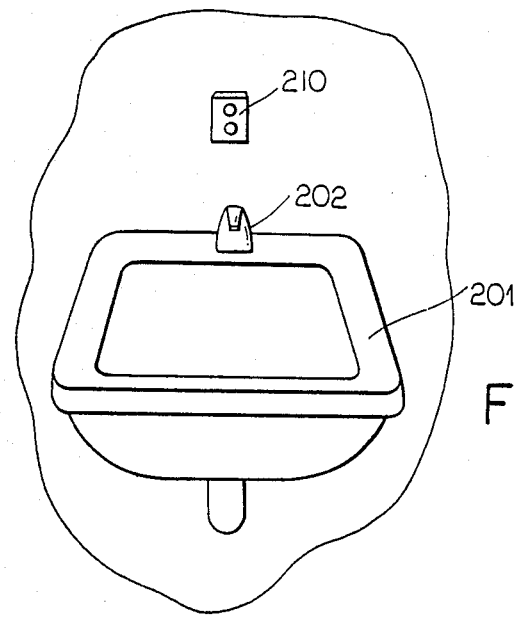
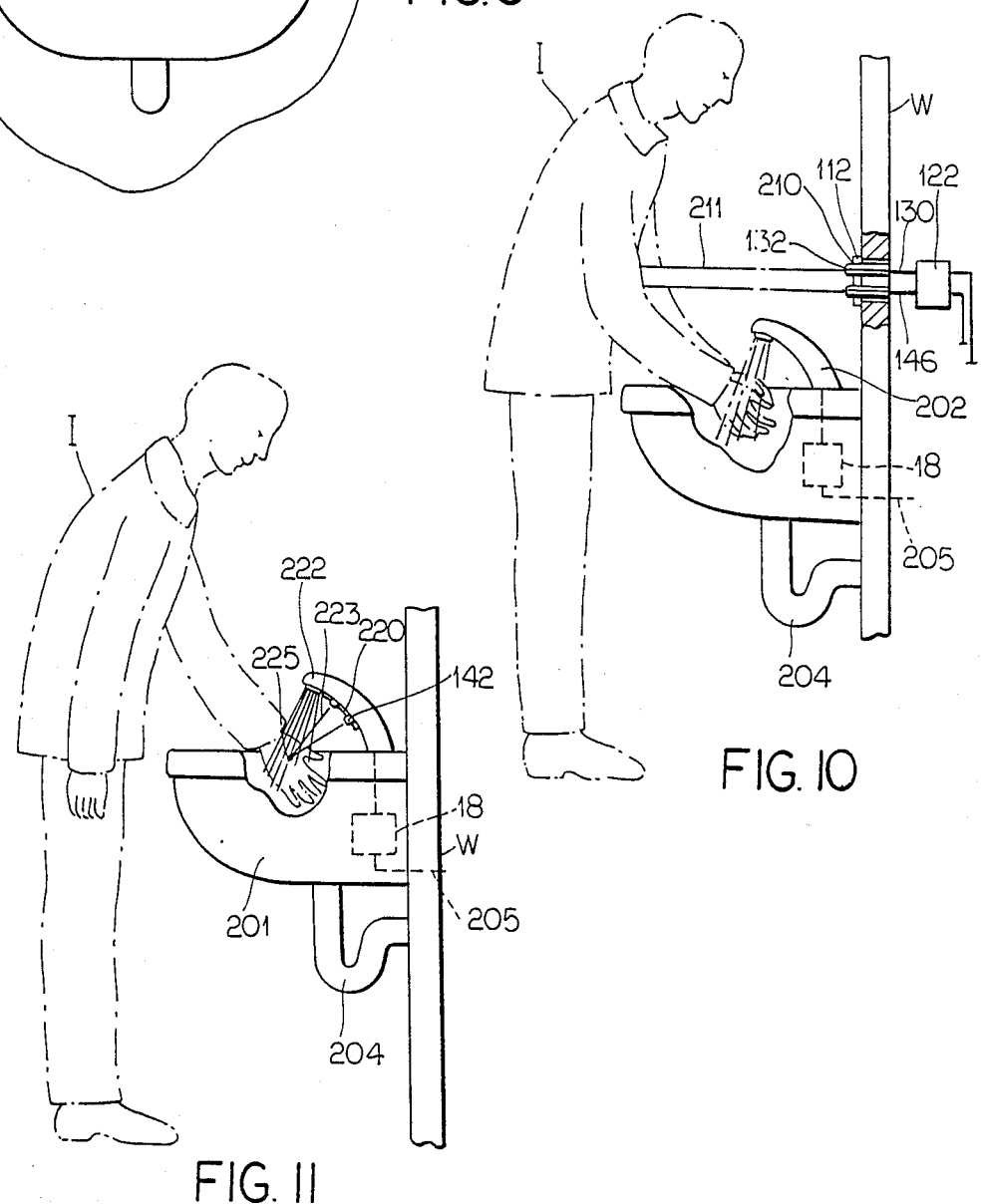
FIG. 9
FIG. 10
FIG. 11

SENSOR OPERATED WATER FLOW CONTROL

SUMMARY OF THE INVENTION

This invention relates to a system for controlling the flow of water, including time of commencement of the flow and time of termination of the flow. More particularly, the invention is concerned with an automatic system for commencement of the flow of water after a predetermined period after activation and time period of running as well as shut-off period.

The invention is also concerned with the constituent elements, including the sensor and ease of repair thereof, as well as the timing circuitry.

The invention finds its use in particular in the control of the flow of water such as in a drinking fountain or flow of water from a spigot or faucet head in a conventional water supply.

More particularly, the invention is concerned with an automatic drinking fountain system having an electrically operated solenoid valve and a pulsed infrared sensor for determining the presence of a person proximate to the drinking fountain for activation thereof to have water supplied from the drinking fountain spigot for drinking purposes.

The sensor transmits pulsed infrared light, and when a prospective user of the drinking fountain is in a preselected distance range from the transmitting portion of the sensor transmitting the pulsed infrared light, the light is reflected off or back from the user and reflected into the receiver of the sensor unit. More particularly, a feature of the invention is to have a separate transmitter for the transmitted pulsed infrared light and a separate receiver for the pulsed infrared light received after the transmitted infrared pulsed light has been reflected from a person within the previously selected preselected range, so that no interference takes place.

The sensor is connected with three control circuits. The first control circuit determines whether or not a person or object has stopped or passed by within the range of the sensor. The sensor includes a pre-set or built-in delay of, in a preferred embodiment, 0.7 to 0.8 seconds before a second circuit is activated. The preset delay is variable in the field, whereas the built-in is pre-set at the factory. This first control circuit can have its delay range reduced preferably to about 0.5 seconds, particularly where use is intended for a busy installation. It should be noted that it is within the scope of the present invention to preselect and predetermine the delay in accordance with the use and location of the installation. The second circuit is activated after the aforesaid delay of approximately 0.7 to 0.8 seconds in the preferred embodiment which is after a prospective user is within the range of the sensor, and then the second control circuit which includes a solenoid valve is activated in order to start the water flow. For a busy installation, the second control circuit is activated after a reduced delay of approximately 0.5 seconds.

In order to avoid excess flow of water because of tampering or other damage to the infrared sensors and/or the water supply spigot, a third control circuit is provided which will take over if a user stays within the range of the infrared sensors for more than a period of 25 to 35 seconds, preferably 30 seconds. This range is, of course, adjustable, depending upon local conditions. This third control circuit will automatically shut down the sensor and solenoid valve and stop the flow of water.

The third control circuit is of extreme importance, because if the sensor is vandalized by putting an object such as a tape over the transmitter or if the drain is blocked, so that no water from the fountain drains into the drain, the sensor will then send a signal to release the solenoid valve after approximately 30 seconds and the water flow from the spigot or fountain will stop so that there will be no overflow and no wastage of water. This particular control which has a desired range of 25 to 35 seconds and a preferred time of 30 seconds is adjustable in the field after installation, so that each installation may be rendered unique for its particular location.

A further feature of the invention is the provision of a molded case for the sensor which can be used either for a new installation or an existing installation so that manual controls can be replaced with automatic controls. For this purpose, the molded case preferably includes two separate openings, each opening for receiving a plastic filter, and preferably an infrared plastic filter, so that infrared energy may be transmitted through one of the filters and infrared energy received through the other filter. It should be noted that the present invention proposes the use of filters which have no focal point, as distinguished from lenses which have a focal point.

A non-molded case may also be used, but at least the face or front of the casing or holders for receiving the filters should be formed of molded plastic. The filter holders and the infrared plastic filters having cooperative elements to permit the filters to be easily and facilely removed and inserted while holding the filters in a secure manner to the filter holders, so that the infrared filters in accordance with this invention may be easily snapped into place and removed so that, if vandalism occurs to destroy or damage the lenses, they can be easily and readily replaced.

In certain installations, the electronics are preferably placed into a vacuum-formed case and then injected with a potting compound to form an electronic module. Such module is preferably used in the faucet head or spigot itself. The potting is used to prevent water and other contamination. When the infrared transmitter and receiver are potted and placed directly in or on the spigot portion, then hydraulically insulated wires are used to transmit and convey the received infrared rays to a circuit remote from the spigot.

The reason for the use of the particular filters is so that the output, light and color can be controlled. The filters themselves are preferably made from plexiglass or other suitable plastic.

PRIOR ART COMPARED WITH THE INVENTION

In general, so far as applicant is aware, the prior art infrared sensors have receivers and transmitters built into a single unit using, in most instances, a lens for the receiver and transmitter going through one filter. The prior art generally uses a piece of plexiglass or, if a filter is used, it is used as a cover and not to provide infrared filtered light energy. Other prior art uses a lens for the receiver and transmitter going through one filter. The only sensor of which applicant is aware which uses separate lenses as well as filters for the transmitter and receiver is applicant's copending U.S. patent application Ser. No. 035,887 filed on April 8, 1987 in the name of Martin J. Laverty, Jr., and assigned to Coyne & Delany Co., and the subject matter thereof is incorporated herein by reference. For the prior art infrared sensors, where both the transmitter and receiver are formed as a single lens unit, a special reflector must be used generally mounted across the room.

With applicant's novel infrared sensor using a separate transmitter and a separate receiver, the distance of transmission can be accurately controlled. More specifically, the distance from the transmitter and receiver which is considered to be within the range of the sensor to cause the transmitted ray to be reflected back can be accurately and carefully controlled so that any breaking and reflecting of the infrared ray transmitted which is not within the particular range will not activate the sensor because it will not be transmitted back to the sensor through the receiving lens.

Also, so far as applicant is aware, the prior art uses plain plexiglass and applicant is the only one who has suggested the use of infrared filters for other than cosmetic purposes, as set forth in applicant's earlier filed co-pending application Ser. No. 035,887, filed in the name of Martin J. Laverty, Jr. In the prior art, the only adjustment is the possibility to move the reflector on the wall so that, depending on the distance from the water fountain to the wall, adjustment is made on the job. However, with applicant's invention, it is possible to use the water supply spigot outdoors because one is not dependent on a particular wall for reflection, but on the intervention of the particular object, which may be a human being, to cause the water to flow from the spigot.

The receiver of the invention is preferably a photodiode, and the distance from the photodiode and the filter at one position and the object from which reflection takes place at a second position is critical and depends on the photodiode. The filter must generally be held flat because tilting will change the direction of the ray.

The solenoid valve is necessary to provide for the internal water flow control, but a conventional solenoid valve which is electrically controlled may be used, and a sensor operated, circuit controlled in accordance with the desired circuitry, drinking fountain or faucet with a solenoid valve to open and close the water flow element is the broad concept of the invention.

One of the advantages of using an infrared ray transmitter and receiver is that the infrared ray will not affect a pacemaker, and use of the infrared sensor is therefore quite suitable for human use.

U.S. Pat. No. 4,682,628 to Stephen A. Hill shows a sensing and valve operating mechanism for remotely controlling a faucet, and employs an infrared detector together with circuitry to turn on and shut off the water supply. Pulsed light is used, but interference from fluorescent light is reduced but not eliminated. It is believed that the reason interference is only reduced and not eliminated is because the repetition rate of the L.E.D. pulses is controlled by a freerunning oscillator that runs at a different frequency from and is not in synchronism with the A.C. power line. The detected signal is then averaged, causing a reduction in the effective amplitude of the 120 Hz (or 100 Hz for 50 Hz power lines) only. Moreover, it would appear that this unit does not perform well under strong steady state lighting conditions, as the sensor used does not have an infrared filter and is sensitive to visible light. Also, the photo transistor used has a dynamic range of only 2 or 3 decades, so some trade-off will have to be made between range and steady state light immunity. The circuit also uses a digital counter.

The sensor according to the invention is distinguished from Hill because the invention uses a photodiode sensor which has both an integral I.R. filter and a dynamic range approaching 10 decades. Further, light immunity is provided for in the inventive system by the use of a synchronous detector instead of a filter scheme alone. A resistor-capacitor network is used to roll off some of the slowly charged signal from the fluorescent so that the amplifiers do not saturate. Although the L.E.D. pulse is low, frequency is a very rapidly changing short duration pulse and consequently is not significantly attained by the R.C. network. This is in contrast with the Hill circuit which achieves its time delay using a digital counter, whereas, in the present invention, use is made of a linear scheme in the circuit of the invention.

FEATURES OF THE INVENTION

The range adjuster is an important feature of the invention.

When used with a drinking fountain, the range adjuster is very important because with the range adjuster, it is possible to prevent one drinking fountain from seeing another located within its vicinity, so that the water flow would never be stopped unless the third control circuit of the present invention is also used. When the sensitivity of the receiver is adjusted and not the direction of the beam or the amount of light transmitted, it is similar to the use of a shutter on a camera; the range can be adjusted so that one unit does not affect another unit, particularly if two infrared sensors are placed opposite to each other. Each sensor is responsive to its own generated and transmitted infrared energy.

In addition, an ideal point or points within a preselected range is provided so that if the person is not within the preselected range, the reflected light will have no effect and not render the circuitry operative to operate the solenoid valve.

If more than one drinking fountain is located in the same area and two drinking fountains are placed physically opposite to each other, it is possible to control the pulse rate so as to prevent the two oppositely placed water fountains from talking to each other or affecting each other, as noted heretofore.

Moreover, as noted heretofore, use is also made of two separate filters in the sensor so that one filter cannot see the other, to insure that the receiver does not go into a working mode until the transmitted infrared ray is both reflected from an object/person within the preselected range and received solely by the receiver. As is well known, there is very little ventilation in a faucet or a drinking fountain so that there is no place to dissipate the heat resulting from any heat build-up. Therefore, use of two separate filters avoids the problems which would result when a single lens and/or a single filter is used.

When the sensor is used with a spigot, there is probably a better chance for one spigot to see the other, depending, of course, on the placement, but there is the possibility for playfullness on the part of individuals, and the third control circuit can be very important to avoid a constant flow of unnecessary water.

Another advantage for the use of two separate filters is that damage or scratching to these elements is a less costly replacement problem because of the size.

In the present invention, use is not made of a lens to limit the field of view; the present invention proposes the use of a photodiode which inherently has a dynamic range approaching ten decades (ratio of smallest detectable signal to the largest detectable signal, i.e., the ratio is qualified by a function of the devices internal noise level and conversion efficiency, relative to the largest detectable signal before saturation occurs). This permits the photodiode to be loaded so that bright light does not cause saturation and the subsequent incidence of additional reflected light from the L.E.D. will still cause additional electrons to be generated within the photodiode. The steady rate or D.C. signal from the photodiode is then coupled with a capacitor passing only the A.C. component to the amplifiers.

The filters used are preferably 880 manometers infrared reddish color material, so that these are ideal for infrared light to pass therethrough. The materials used for the infrared filters generally include plastics, glass or equivalent.

BRIEF DESCRIPTION OF THE DRAWINGS

FIG. 9 is a partial perspective front view of one embodiment of a faucet together with a sensor device of the type shown in FIGS. 5 to 8 and using the circuitry of FIGS. 3 and 4; the sensor device in this embodiment is mounted on the wall;

FIG. 10 is a side view of the faucet, basin and sensor device shown in FIG. 9 with the individual in position for washing of the hands;

FIG. 11 is a modification of the faucet and wash basin shown in FIGS. 9 and 10 with the sensor device mounted as an integral unit in the faucet spigot;

DESCRIPTION OF THE PREFERRED EMBODIMENT

Figure 1:
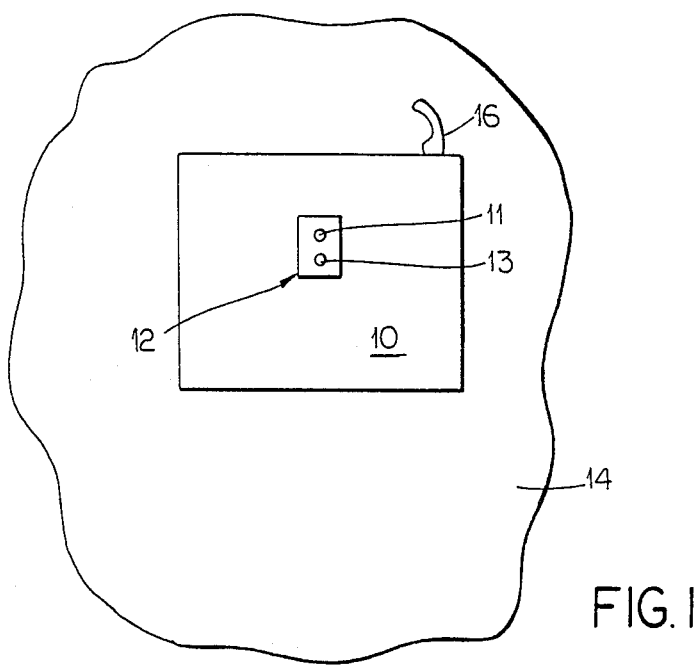
FIG. 1 is a side view of a drinking fountain mounted on a wall together with an infrared sensor on a front side showing one embodiment of the invention.
Figure 2:
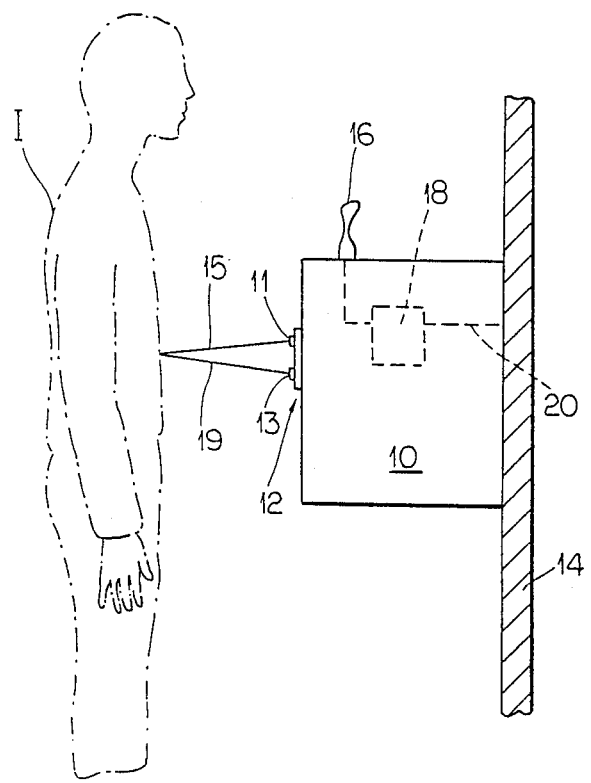
FIG. 2 is a side view of the drinking fountain shown in FIG. 1 with an individual shown in phantom outline and with the sensor mounted onto the drinking fountain housing or casing for the controls, and which casing is wall mounted.

Referring now more particularly to FIGS. 1 and 2 of the drawings, a conventional water fountain 10 is shown with, according to the invention, an infrared pulsed sensor 12 supported on a side of water fountain 10; fountain 10 is hung on a wall 14, partially shown. Sensor 12 is activated to cause water to be supplied from spigot 16 when an individual I shown in phantom outline. For this purpose, a solenoid valve 18, schematically shown in water line 20, is provided to control the flow and cut-off of water flow in water line 20 going to faucet head or spigot 16. As will be explained in detail hereinafter, the operation of the drinking fountain 10 is controlled both externally as well as internally and isolated from public access control. An individual I when in a proper preselected position in front of drinking fountain 10 is capable of rendering it operative, but only under preselected conditions not within the user's control, other than being in a proper position. Other circuit controls, as will be explained, also control the commencement, duration and stoppage of water flow.

While only a single fountain is shown, it is possible for more than one fountain to be used, and for a fountain to be placed on an opposite wall, and the sensor 12 for each fountain 10 is adjusted so that it will not operate in response to transmission from another fountain or any other sensor operated apparatus or fixture. Also, sensor 12 is so adjusted that an individual such as I shown in phantom outline who momentarily passes in front of the fountain will not cause water to flow from the spigot, but if individual I approaches and returns the infrared beam for a preselected time period of about 0.7 to 0.8 seconds, then the circuitry will cause the water to flow. Now, if the individual I stays in the infrared sensor range for a preselected time period greater than 30±5 seconds, the water flow will shut off, and solenoid valve 18 is operated so that individual I will have to leave the infrared sensor range before the water flow will again commence.

Sensor 12 includes an infrared transmitting filter 11 for transmitting along path 15 until it strikes individual I at point 17 and is retransmitted back along path 19 until it is received by an infrared receiving filter 13. Point 17 is an ideal preselected location at which the sensor is operative to be activated.

Figure 3:
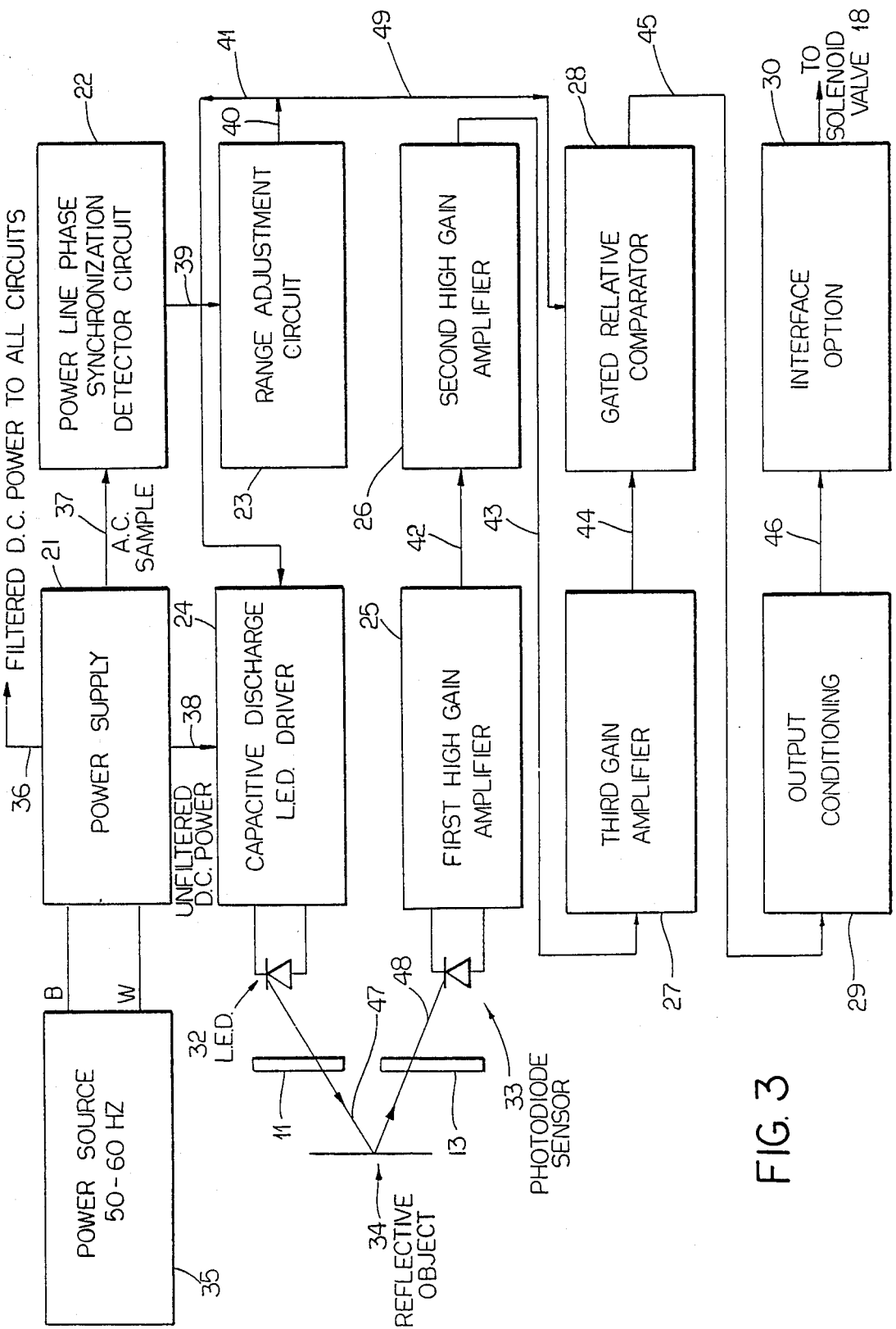
FIG. 3 is a block diagram of a preferred embodiment of a circuit including the three control circuits according to the invention for imparting the various controls to the drinking fountain.
Figure 4A:
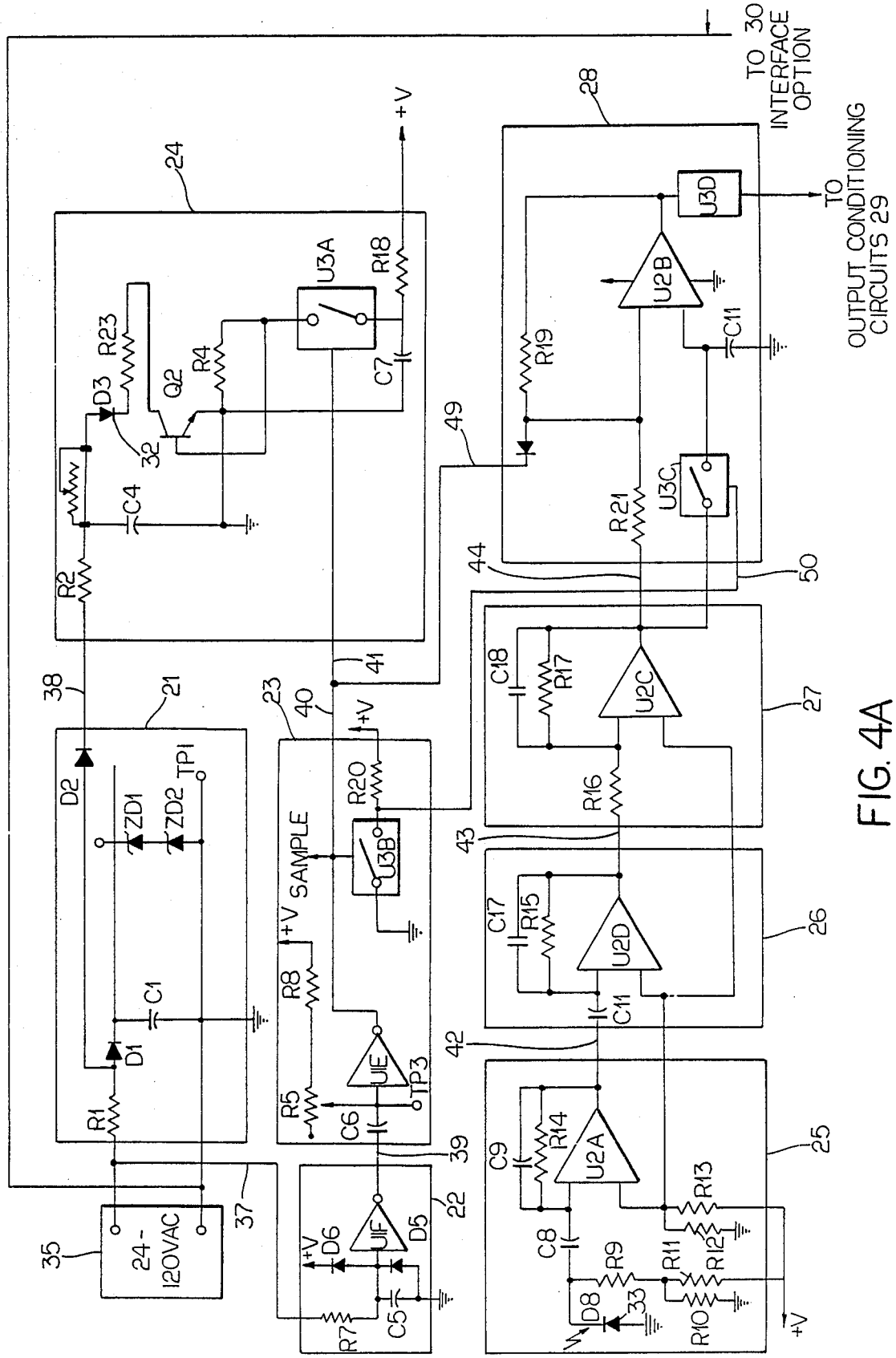
FIG. 4 is composed of FIGS. 4A and 4B on separate sheets, and is a schematic circuit layout of the various components forming the block diagram of FIG. 3.
Figure 4B:
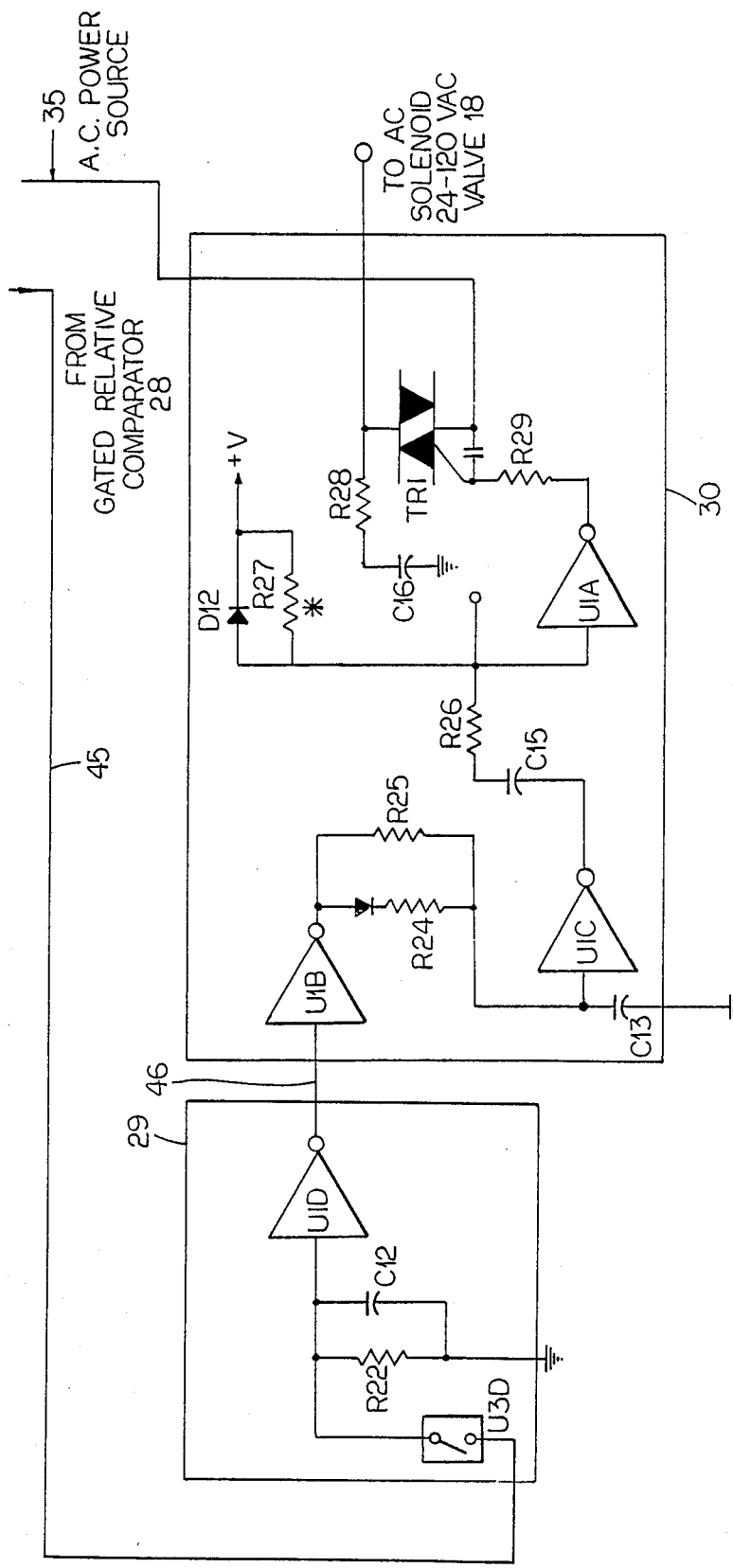

Referring now more particularly to FIGS. 3 and 4 which show a block diagram and a detailed circuit layout of the detailed circuitry of the block diagram of a long range diffuse photo sensor circuit of the present invention.

The photo sensor circuit as shown in the block diagram in FIG. 3 includes a power supply 21 having as its input, an A.C. power source 35 from a conventional 50–60 Hz power source or a conventional step-down transformer (not shown). Power supply 21 provides throughputs, one over line 36, one over line 37, and the other over line 38. The output over line 36 is a filtered D.C. power output to all circuits over line 36 to operate the various units of the photo sensor circuit, the second output is an A.C. sample supplied over line 37 to a power line phase synchronization detector 22, and the third output supplies unfiltered D.C. power over line 38 to a capacitive discharge L.E.D. driver circuit 24. L.E.D. (light emitting diode) diode 32 is coupled to the output of L.E.D. driver circuit 24. It has been found that the use of unfiltered D.C. power for the operation of L.E.D. 32 helps keep some of the circuit components physically smaller.

As best seen in FIG. 4A, power supply 21 includes components R1, D1, D2, C1, ZD1, ZD2. The value of R1 is adjusted to accommodate source voltages from 24 to 120 V.A.C. To provide for operation from a 240 V.A.C. source, this is accomplished with substantially the same circuitry by substituting a capacitor for resistor R1 and adding an additional rectifier with its cathode connected to the junction of R1 and D1 and its anode connected to circuit common.

Power line phase synchronization detector circuit 22 receives the A.C. sample output along line 37 from power supply 21 from which it generates a precisely phased pulsed output and fed on line 39 to trigger a range adjustment circuit 23. Range adjustment circuit output on line 40 is broken up into lines 41 and 49. Line 41 is directed to gated relative comparator 28 and line 49 is directed to capacitive discharge L.E.D. driver 24. This pulse output from detector circuit 22 initiates a brief sample period during which capacitative discharge L.E.D. driver 24 activates light emitting diode 32 so that the photo sensor circuit will output a pulse of filtered light, once every 16.7 milliseconds, because a filter light through infrared filter 11 in direction path 47 via L.E.D. 32 and then "look" for that specific light pulse's reflection through infrared receiving filter 13 in direction path 48 from a reflective object or an individual 34 which is within a preselected range for the transmitted pulse in direction path 47 to be reflected in the direction path 48 for reception by photodiode sensor 33. The duration of the pulse of current supplied to the L.E.D. 32 is approximately three to five seconds.

Photodiode sensor 33 has its output coupled to the input of a light gain amplifying system including first high gain amplifier 25 which in turn is coupled through line 42 to second high gain amplifier 26, which in turn has its signal output coupled to third high gain amplifier 27 through line 43.

By consistently sampling at the same time with respect to the zero voltage crossing of the A.C. power source, the photo sensor circuit accomplishes an extremely high degree of rejection of extraneous pulsing line powered light sources such as fluorescent, mercury vapor and high pressure sodium lamps. By being in phase with the D.C. power line, photodiode sensor 33 of the photo sensor circuit "sees" the same ambient light intensity each time photodiode 33 of the photo sensor circuit "looks" for its own reflected pulse along direction path 48. This technique increases the overall "signal to noise ratio" of the photo sensor circuit. One effect of the application of this technique is to cancel the noise superimposed on the signal from third gain amplifier 27 over line 44 applied therefrom to gated relative comparator 28 and thereby making it possible to differentiate with less ambiguity the point at which a reflective object 34 (such as a human being) comes into or goes out of the sensing range of the photo sensor circuit. Due to the constant phase relationship of the synchronization pulse to the A.C. power source and the short duration of the sample period relative to the A.C. power source's half cycle, multiple units may be constructed so that their respective sample periods occur at different and non-overlapping times during the A.C. power source's half cycle. This feature allows and assures that the photo sensor circuit operates only in response to its own reflected light pulse while in direct view of light pulses from other photo sensor circuits operated at slightly different times. It should be noted that there is usually more than one light source in the same location, and with the present invention, it is possible to prevent a light source from an undesired location speaking to or activating a receptor at another location.

The power line phase synchronization detector circuit 22 is important in the scheme of the operation and circuitry because of the significance of the synchronization detector 22, as follows. Due to the requirements of low power consumption imposed by the need for direct line operation, and the need for maximum L.E.D. intensity to increase the signal to noise ratio, a capacitive discharge circuit is used to drive the L.E.D. As a result, the duration of the pulse of current supplied to the L.E.D. is very brief, in the neighborhood of three microseconds. Since it would be economically prohibitive to gate the amplifiers for such a low level, high speed signal and, since the composite signal will also contain a relatively large component from fluorescent lamps, a special synchronous detector was configured. The action of the detector is complex.

One aspect of the detector 22 is that it is synchronous with both the L.E.D. pulse and the A.C. power line. This, combined with the fact that the L.E.D. pulse is very brief with respect to the period of the A.C. line, allows the different sensors to operate in different time slots without interfering with one another. The use of more than one sensor takes place in an installation where more than one fixture is used and each fixture is to be differently time controlled. Since the propagation delay of the amplifiers is inversely proportional to the amplitude of received L.E.D. pulses, adjustment is possible of the length of the period over which the detector is allowed to operate, thereby creating a means of adjusting the operating range of the sensor over an extremely wide range with only a single potentiometer. Additionally, a bias is applied to the detector that is relative to the composite signal input to the detector and opposite in polarity to the positive slope of a signal from fluorescent lamps and the reflected L.E.D. signal. Since the slope (dv/dt) of the signal from fluorescent lamps is very low relative to the slope of the L.E.D. signal, it cannot, in the brief time during which the detector is enabled, overcome the applied bias and is thereby completely rejected at this stage. Conversely, the slope of the L.E.D. signal is very high and easily overcomes the bias, thereby effecting direction if it occurs during the time when the detector is enabled.

In this invention, the phase relationship of the sample period to the A.C. power source is adjustable and is varied by adjusting the value of a resistor in a resistor-capacitor network or by digitally programming a synchronous down counter or by digitally programming a comparator and a synchronous counter. This power line phase synchronization detector circuit 22 includes components R7, C5, D5, D6 and U1F.

Referring now more particularly to range adjustment circuit 23 which has its input coupled to the output of the power line phase synchronization detector circuit 22 through line 39, range adjustment circuit 23 receives a trigger pulse by means of line 39 from power line phase synchronization detector circuit 22, and upon receiving the trigger pulse, range adjustment circuit 23 provides an output over line 40 to trigger capacitive discharge L.E.D. driver circuit 24 to output a pulse of light, as indicated by light pulse path 47 from L.E.D. 32 and directed towards reflective object 34. Gated relative comparator 28 is coupled to the outputs of both range adjustment circuit 23 through lines 40 and 49 and third gain amplifier 27 through line 43. Line 40 provides the signal to comparator 28 for controlling the sample period over which gated relative comparator 28 is allowed to sample the output 44 of third gain amplifier 27.

It should be particularly noted that a feature of the invention is the sample period, and the period of this sample pulse is varied by adjusting the value of a resistor in a resistor-capacitor network or by digitally programming a synchronous down counter or by digitally programming a comparator and a synchronous counter. The range at which an object's presence is detected is proportional to the duration of the sample period. Increasing the duration of the sample period increases the range. This means of adjustment is a novel and practical way of obtaining an extremely large, relatively linear, range of adjustment with an inexpensive circuit configuration. Unique advantage is taken of the silicon operational amplifier's nonlinear, inverse relationship between signal level and propagation delay.

There is no synchronization pulse derived from or applied to first high gain amplifier 25. The stronger the reflected light pulse reflected along path 48 received by photo diode 33, the faster the signal will propagate through amplifiers 25, 26, 27. This effect allows the sensing range to be set by varying the amount of sample time allowed for the appearance of the rising edge of the received signal at the output of third gain amplifier transmitted along line 44 to gated relative comparator 45. If the rising edge of the received signal appears as an output from third gain amplifier 27 along line 44 of the third gain amplifier 27 before the end of the sample period, then the object will be detected. But, if the sample period ends before the rising edge of the received signal appears, then the object will not be detected. The time required for the received signal to appear is nearly directly proportional to the distance of a target of fixed size from the photo sensor circuit. Since the adjustment of the sample period may be made in a linear fashion, the detection range may be set with equal ease over any portion of the sensor's extremely broad operating range. This range adjustment circuit 23 includes components C6, R5, R8, U1E, U3B, R20. It should be noted that R5 is a potentiometer, and is schematically shown. Output 50 is taken from the anode of U3B and coupled to the input of cathode U3C of gated relative comparator 28.

As noted heretofore, it is possible to operate directly from A.C. power sources up to 240 volts without the need for step down transformers, but this requires that the power consumption of the circuit be kept extremely low. Since the most hungry power portion of the reflective photo sensing process is generating the light which is to be reflected, a capacitive discharge technique is used.

Capacitive discharge is a commonly used technique for achieving high instantaneous pulses of power from a relatively lower average power consumption. This is typically used in pulsed lasers and automotive ignition systems.

During a portion of the A.C. half cycle, energy is accumulated at a low rate of current flow in a storage capacitor. Upon the capacitative discharge L.E.D. driver 24 receiving the trigger pulse from range adjustment circuit 23 through line 40, energy stored in the capacitor is dumped into L.E.D. diode 32 creating a high current pulse of very brief duration. This creates an intense pulse of light emitted from L.E.D. 32. The application of this technique increases the overall signal to noise ratio of the photo sensor circuit, thereby making the detection of objects at a much longer distance under a variety of ambient lighting conditions possible. It also makes possible a compact, low power device that may be operated directly from line voltages without a step down transformer and its consequent size, weight and cost. This capacitative discharge L.E.D. driver 24 circuit includes components R2, R4, R18, R23, C4, C7, D3, Q2, U3A.

Photodiode sensor or light sensing element 33 is a fast response photodiode which acts as a light receiver and is used as a light sensor. The photodiode is operated in the reversible bias mode for faster response to the brief pulse of reflected light as indicated by the path of the receiving ray 48 received from reflective object 34 after impinging thereon when transmitted from L.E.D. 32.

In order to take maximum advantage of the large dynamic operating range of photodiode 33, it is connected to a relatively low load resistance and then capacitively coupled into the first high gain amplifier 25. This allows the photo sensor circuit to operate normally with relatively large levels of light from such sources as the sun or other extraneous unwanted or unnecessary light. The use of a low value of coupling capacitance at the input of the high gain amplifier 25 provides some rejection of 50-60 Hz light noise. Due to the low output of photodiode 33 and the further attenuation created by the load resistance to which the output of photodiode 33 is connected, a great deal of amplification is required to make the signal usable; therefore, first gain amplifier 25 is operated at its highest gain possible without losing stability. This first high gain amplifier circuit 25 includes components D8, R9, R10, R11, C8, C9, R14, U2A, R12, R13.

A second high gain amplifier 26 has its input coupled to the output of first high gain amplifier 25 through line 26. Second high gain amplifier 26 is A.C. coupled through capacitor C10, and this inverting high gain amplifier stage is operated at the highest gain possible without losing stability. The use of a small value of coupling capacitance provides some rejection of 50-60 Hz light noise. This second high gain amplifier circuit 26 includes components C10, C17, R15, U2D.

There is also provided a third high gain amplifier 27 which is D.C. coupled through resistor R16 to second high gain amplifier 26 over line 43. This D.C. coupled inverting amplifier stage 27 is operated at a relatively low gain. The signal level output from this stage is sufficient to drive a gated relative comparator 28. The third high gain amplifier circuit 27 includes components R16, R17, C18, U2C.

Gated relative comparator 28 is the key to the signal detection scheme. By sampling the output signal supplied along 44 from third gain amplifier 27 just as L.E.D. 32 is fired, and holding that level through the remainder of the sample period, a stable reference voltage is established against which a relative increase in signal supplied along 44 may be detected. Since this reference voltage is representative of the composite light signal being received at photodiode 33 at the instant the sample period begins, and since the ambient portion of these signals changes very little during the relatively brief sample period, a very high degree of rejection of ambient light sources other than the reflected light 48 from L.E.D. 32 is achieved. The gated relative comparator 28 is gated off except while sampling to prevent extraneous operation from high intensity fluorescent, mercury vapor or high pressure sodium lamps. For this purpose, the anode of U3B of range adjustment circuit 23 is coupled via line 50 to the cathode of U3C of gated relative comparator 28 to turn U3B and U3C on together whenever a samples is taken. In effect, U3B activates U3C. Hysteresis insures that the gated relative comparator will remain off, once the sample period begins, until a sufficient or predetermined change in signal 44 has occurred. Once on, hysteresis keeps that gated relative comparator 28 on for the remainder of the sample period, thereby providing a solid signal output 45. The output 45 of the gated relative comparator 28 is a positive pulse train when an object is detected. The gated relative comparator 28 includes components U3C, C11, R21, U2B, D7 and R19.

Output conditioning circuit 29 is coupled to the output of gated relative comparator 28 by line 45 and has its ouput supplied to interface option 30 via line 46 and converts the pulse train ouput supplied thereto along line 45 from gated relative comparator 28 to a static "on" or "off" level. A low output voltage indicates the condition "object detected" and a high output voltage indicates that no object is detected. Optional components may be installed at this stage to adjust response time characteristics of the "on" or "off" level. This output conditioning circuit 29 includes components C12, U1D, R22 and U3D.

Interface 30 comprises whatever components are necessary to convert the "on" or "off" output supplied thereto by line 46 of the output conditioning circuit 29 to the logic and signal levels required by a specific task. Interface 30 includes U1B, D10, R25, C13, U1C, C15, R26, U1A, D12, R27, C16, R28, TR1, R29. The output from interface 30 goes to the solenoid coil of solenoid valve 18.

Like parts are designated with the same reference numerals throughout and all embodiments employ solenoid valve 18 or equivalent.

For the circuit layout shown in FIG. 4, the various electrical components and electrical elements used in the block diagram of FIG. 3 are as follows:

| Power Supply 21 | |
|---|---|
| D1 | IN 4007 |
| D2 | IN 4007 |
| ZD1 | IN 754 |
| ZD2 | IN 754 |
| C1 | 47 µf, 3.5 v. |
| R1 | 4K, 5W |

| Power Line Phase Synschronization Detector Circuit 22 | |
|---|---|
| R7 | 100K |
| C5 | 0.001 µf |
| D5 | IN 4148 |
| D6 | IN 4148 |
| U1F | 74C14 |

| Range Adjustment Circuit 23 | |
|---|---|
| C6 | 0.001 µf |
| R5 | 100K |
| R8 | 10K |
| R20 | 100K |
| U1E | 74C14 |
| U1B | 74C14 |

| Capacitive Discharge L.E.D. Driver Circuit 24 | |
|---|---|
| R2 | 1K |
| R4 | 100K |
| R18 | 1.0K |
| R23 | 1.8 Amps. |
| C4 | 0.7 µf, 35 volts |
| C7 | 0.1 µf |
| D3 | IN 4007 |
| Q2 | 2N2222 LED discharge transistor |
| U3A | LED Transistor Pulse Driver TLC274CN |

| First High Gain Amplifier Circuit 25 | |
|---|---|
| D8 | IN 4148 |
| R9 | 100K |
| R10 | 10K |
| R11 | 10K |
| R12 | 100K |
| R13 | 100K |
| R14 | 10 M |
| C8 | 0.001 µf |
| C9 | 47 µf |
| U2A | TLC274CN |

| Second High Gain Amplifier Circuit 26 | |
|---|---|
| C10 | 0.001 µf |
| C17 | 47 µf |
| R15 | 10 M |
| U2D | TLC274CN |

| Gated Relative Comparator 28 | |
|---|---|
| U2B | TLC274CN |
| U3C | CD 4066 |
| C11 | 0.1 µf |
| D7 | IN 4148 |
| R19 | 100K |
| R21 | 10K |

| Output Conditioning Circuit 29 | |
|---|---|
| C12 | 0.1 µf |
| R22 | 2.2 M |
| U1D | 74C14 |
| U3D | CD 4066 |

| Interface 30 | |
|---|---|
| U1A | IN 4148 |
| U1B | IN 4148 |
| U1C | IN 4148 |
| C13 | 2.2 µf |
| C15 | 33 µf |
| C16 | 0.001 µf, 1 KV |
| R24 | 10K |
| R25 | 220K |
| R26 | 1K |
| R27 | 820K |
| R28 | 56K |
| R29 | 36K |

| | -continued |
|---|---|
| | Interface 30 |
| D10 | IN 4148 |
| D12 | IN 4148 |
| TR1 | Output switch 2N6073B |

Figure 5:
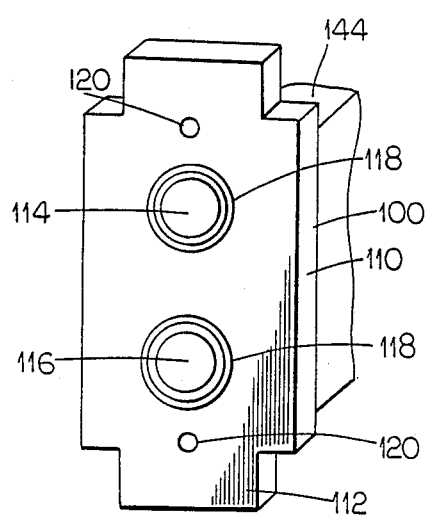
FIG. 5 is a partially perspective front view of the sensor and the casing according to the invention showing an infrared receiving filter and an infrared transmitting filter.

Referring now to FIGS. 5 to 8, and more particularly to FIG. 5, sensor unit 100 includes an outer casing 110, partially cut-off with the inner components not shown and a front plate or cover 112, infrared filters 114 and 116 held within cover 112. Infrared filters 114 and 116 are of the same type of equivalent and perform the function of infrared filters 11 and 13. Ferrule or plastic raised ring 118 is provided for each filter to retain the filter on front cover or plate 112. Front plate 112 as seen from its outer surface is the same for the FIG. 6 and FIGS. 7-8 embodiments and is held to casing 110 by conventional locking elements 120 which may be a rivet if no access or limited access is desired or a screw-nut combination is to be used if access is to be provided.

Figure 6:
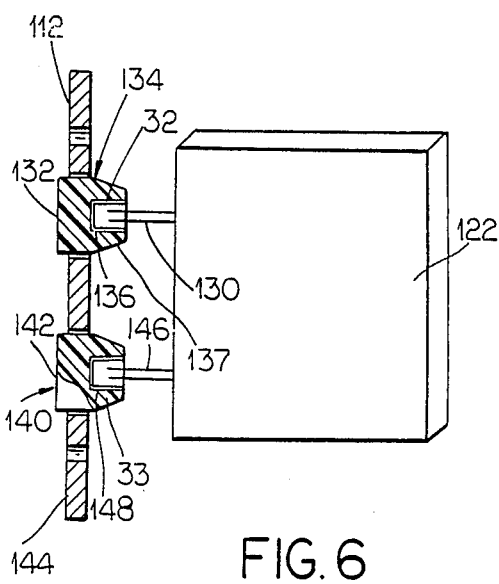
FIG. 6 is a partial sectional view of the front cover of one embodiment of the front panel with the remaining portion of the casing removed and showing the infrared filter system and a schematic showing of a potted printed circuit containing the circuitry of FIGS. 3 and 4.

Referring now to FIG. 6 which shows a side view of one embodiment of sensor unit 100 with outer casing 110 removed and a printed circuit board 122, light emitting diode 32, and electrical connections 130 to capacitative discharge L.E.D. driver 24 (see FIG. 3) and infrared filter 132. Filters 132 and 142 are cemented into cover 112.

Infrared filter 132 which is used as the transmitting filter is sealed to or connected to transmitting casing unit 134 which includes a locating ring 136 for locating and positioning L.E.D. 32 which is received in and supported in transmitting casing unit 134 in its proper position. In this embodiment, infrared filter 132 is cemented to front plate or cover 112. The filter 132 and L.E.D. 32 together may form a single unit, or L.E.D. 32, or be received within area 137. The receiver of the sensor includes a separate unit 140 formed of photodiode sensor 33 and infrared filter 142 cemented to receiver casing unit 144 and, photodiode sensor 33 (or infrared receiver) is contained within and sealed in unit 140. Wires 146 from photodiode sensor 33 are connected with first high gain amplifier 25 on circuit board 122, and sensor 33 is held in holding portion 148. While filters 132, 142 are cemented within casing units 134, 144, respectively, they can be uncemented and removed. However, the filters can become damaged during removal.

Figure 7:
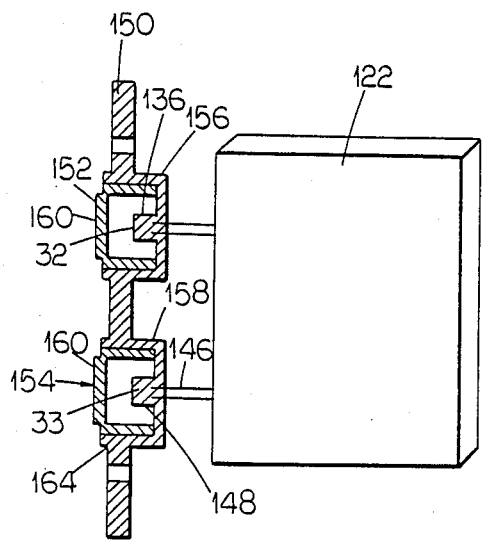
FIG. 7 is a side view, partially in section, of a modified sensor showing the printed circuit board of the circuitry of FIGS. 3 and 4 and another embodiment of the front panel.
Figure 8:
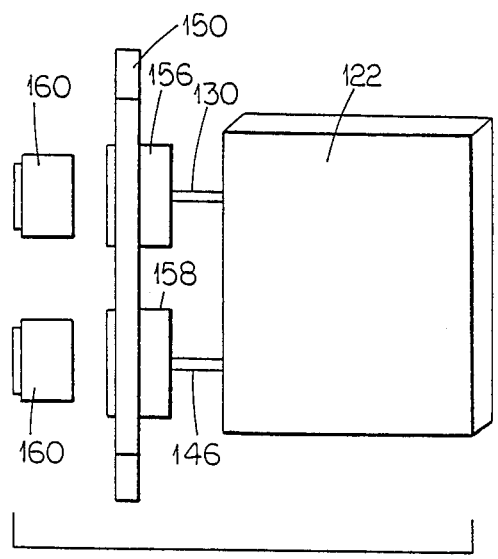
FIG. 8 is another side view schematically shown of the sensor of FIG. 7 showing the filters separated or removed from the front panel.

Referring now to FIGS. 7 and 8 which show a preferred cover 150 having two infrared filter systems 152, 154 each having a cup-shaped filter holding portions 156, 158 and a removable and interchangeable filters 160. The filters 160 of systems 152, 154 are not cemented to cover 150 but are press-fitted and received within and held to cover 150. The outer periphery 162 of filter 160 is receivable within and frictionally held within inner surface portion 164 of holding portions 156 or 158 to render filters 152, 154 easily removable and replaceable. Other suitable clamping and/or holding means may be used so long as the filters are readily reparable in the field installation.

In the FIGS. 7, 8 embodiment, an expanded view is shown in FIG. 8 with filters 160 removed from holding portions 156, 158 to expose L.E.D. 32 and photodiode sensor receiver 33 to facilitate changing of the infrared filters, should they become scratched or damaged in any manner. Also, if necessary, the circuit board 122 can be readily and easily changed, as well as L.E.D. 32 and photodiode 33. In the FIG. 6 embodiment, filters 132 and 142, as heretofore noted, are cemented into the holding portions 134 and 144, respectively, which makes them somewhat more difficult to change.

In filter systems 152, 154, the light emitting diode 32 and photodiode sensor 33 form an integral unit with cup-shaped portions 156, 158 respectively and are sealed or epoxyed together, further to prevent damage to the components.

Figure 12:
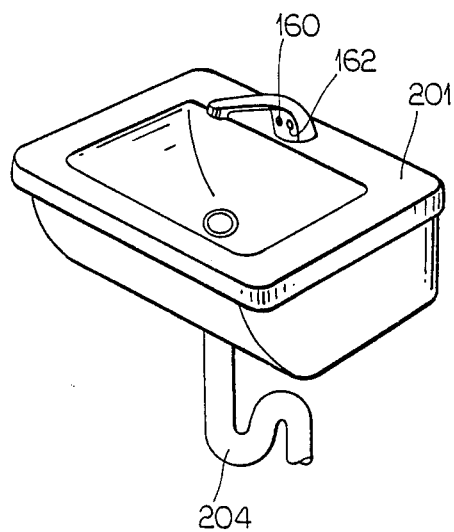
FIG. 12 is another modification of the sensor device mounted in the faucet spigot.
Figure 13:
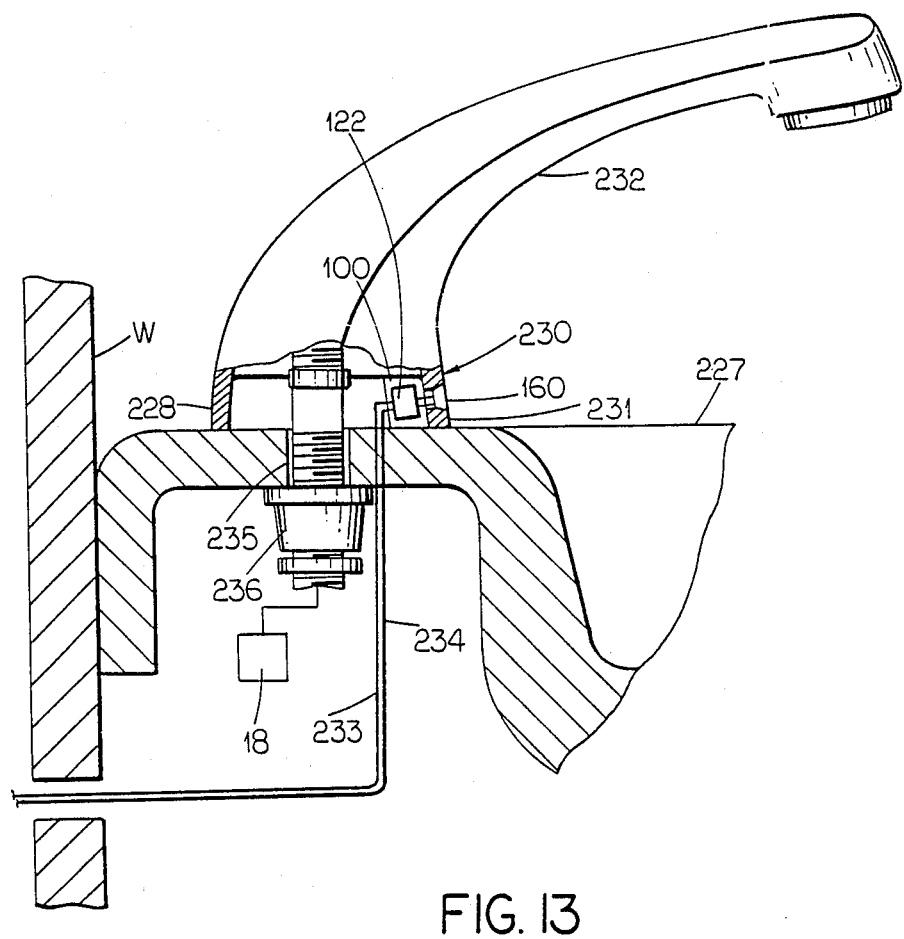
FIG. 13 is a partial sectional view of the faucet with the sensor mounted within the faucet spigot itself.

Referring now more particularly to FIGS. 9 to 13, which show a sink or wash basin 201 and a faucet 202, solenoid valve 18 shown in dotted outline connected in water supply line 205. Solenoid valve 18 is operated by circuit interface option 30 for the control of water flow; and a wall mounted sensor 210 in FIGS. 9 and 10, and a sensor 220 mounted in spigot 222 in FIG. 11, and an alternative or modified spigot 232 having the sensor 230 built in, as best seen in FIGS. 12 and 13.

Wall mounted sensor 210 is of the same type as infrared pulsed sensor 12 described in connection with FIGS. 1 and 2. The circuitry for sensor 210 and the manner of operation is the same as discussed in connection with FIGS. 3 and 4 to operate solenoid valve 18 which controls the water flow, and the sensor itself may be of the type disclosed in FIGS. 5 to 8. In addition, solenoid valve 18 is controlled by sensor 210 to control the flow of water in line 205 to the faucet head or spigot.

Referring now more particularly to FIG. 10, it is possible to use a portion of the casing of sensor unit 100 and to use only the front plate cover 112 with the circuit board 122 behind wall W with electrical connections 130 extending to L.E.D. 32 behind infrared filter 132 and electrical connections 146 extending to photodiode sensor 33 behind infrared filter 142.

It is also possible to use cover 150 and removable filter covers 160 in connection with holding portions 156 and 158, respectively, as shown in FIGS. 7 and 8 to provide the infrared filters for L.E.D. 32 and photodiode sensor 33.

Turning now more specifically to FIG. 11, spigot mounted sensor 220 is shown on spigot 222 with the rays 223 being directed to the approximate position where the hands of a user may be expected and receiving rays 224 being returned to infrared filter 142. A cross point 225 is shown which is at a predetermined distance from the sensor such that the cross point 225 of the receiving and transmitting infrared rays is the ideal location for the received rays to render the sensor operative. A short predetermined distance on either side of point 225 will render the sensor operative, and this is preselected. Basin 203 is shown with a conventional drain pipe 204, both mounted to wall W. Solenoid valve 18 is also coupled in water supply line 205 and controlled by the circuitry of FIGS. 5 and 6.

Sensor 210 in FIG. 10 is shown directing the rays in a substantially horizontal direction. Sending infrared ray 211 is transmitted through filter 132 until it impinges onto an individual I and if the individual I is within a predetermined distance from bowl or basin 201 and/or spigot 202, then an infrared ray 212 is returned to the sensor 210; infrared ray 212 is returned from individual I and transmitted through infrared filter 142 to circuit board 122 and operates in accordance with the circuit in FIGS. 3 and 4. Solenoid valve 18 is connected in circuit with the water supply to control the flow of water and shut off the flow when programmed.

The operation of the system as shown in FIG. 11 is the same as that in FIG. 10, except that the transmitted rays 223 and the received rays 224 are shown crossing each other. The cross point 225 is predetermined as well as the position of the hands is predetermined, in order to activate the sensor and circuitry. The cross point 225 shows an area or position at which the hands would be within a predetermined range to render the sensor operative so that, when transmitted rays are reflected back from a closer point, such as when cleaning, the faucet is not turned on, and if the hands of the individual I are too remote or too far away from the faucet head, the faucet also is not turned on. If necessary, instructions to a prospective user to advise about the distance of the hands from the faucet head can be supplied.

Referring now more particularly to FIGS. 12 and 13, bowl 201 is connected to conventional drain pipe 204 and is mounted to wall W in a conventional manner. Sensor 230 is built into spigot 232 which is made as a brass casting, and the unit here is very much similar to the unit shown in FIGS. 7 and 8 with infrared filters 160 being all that is visible and being removable. Using brass for spigot 232 renders it vandal-resistant and free from rust. This is particularly useful to protect the sensor 230. Placement of sensor 230 at the base of spigot 232 prevents unwanted heat from vandalizing the sensor because heat rises and does not attach the sensor 230. The back plate portion 231 of spigot 232 is made very much similar to cover 150 of FIGS. 7 and 8 in order to receive filters 160. The circuit board 122 is shown with its cover removed and the wires 233 and 234 which are connected to the circuitry shown in FIGS. 3 and 4, and the supply wires 233, 234 are shown taken out through the back wall within the body of the bowl so that there are no obvious external connections. Spigot 232 is conventionally connected by a hollow liquid flow through bolt 235 and nut 236, and the water supply passes through the conventional hollow bolt 235.

I preferably make the front face 229 of base 228 of spigot 232 at an angle of ten degrees to the top 227 of the basin. Assuming the basin 227 is flat so that a single frequency can be used with all of the sensors 230 in the same installation. As shown in the drawing, the angle between the outside or front face 229 of spigot 232 and the top 227 of the basin form an obtuse angle of 100°.

The circuitry disclosed herein as well as the water supply units cooperate to be rendered operative for a predetermined period of time after a preset desired delay, and when an outside body moves within a predetermined range.

The circuitry cooperates with the water supply so that there is a 30 second time out and the delay is such that the water does not start to run immediately, and in addition, there is a predetermined time period selected during which the water runs.

The water supply units can be provided with both replacable and non-replacable infrared filters. It is preferred for certain installations that these filters be replacable.

As noted heretofore, the range or the distance within which an object can activate the circuitry is such that the range is adjustable, so that an individual does not have to be too close or touch the item itself. In fact, I prefer that the circuitry be inoperative when an individual is touching the water supply unit.

One of the advantages of the faucet with the sensor built in is that any heat which has built up within the spigot of the water supply faucet will be dissipated automatically. In effect, the casing itself, together with the spigot, will take the heat away. In addition, where casing 100 is not used, other means can be provided to separate the circuit board 122 from any water contact.

While there has been shown what are considered to be the preferred embodiments of the invention, various modifications and changes may be made therein without departing from the scope of the invention.

What is claimed is:

1. A system for controlling the flow of water through water supply means, including:
   a sensor operatively associated with said water supply means to cause water to be supplied by said water supply means;
   a first control circuit coupled with said sensor for sensing and determining the continued external activation characteristic of the presence of a user or external activation proximate to said sensor and within the range of energization of said sensor and the absence of the characteristic of external activation or presence of a user;
   a second control circuit including water flow time commencement means responsive to said characteristic for determining the time of commencement of the flow of water through said water supply means in response to an external activation of said sensor after the elapse of a predetermined period of time; and
   a third control circuit responsive to said second control circuit including water flow shut-off means for permitting water to flow solely for a predetermined period of time after commencement of water flow by said second control circuit, said third control circuit causing the water flow to be shut off after a predetermined period of time of water flow and overriding said second control circuit to prevent said second control circuit from commencing water flow.

2. The system of claim 1, wherein said sensor includes means for transmitting pulsed infrared light and means for receiving a reflection of said pulsed infrared light transmitted from said transmitting means after impingement onto an object within a pre-designated range distance from said sensor.

3. The system of claim 1, including a solenoid valve connected in circuit with said second and third control circuits and connected with said water supply means, and wherein said commencement means includes a preset delay of a predetermined amount of seconds, said solenoid valve being responsive to said second control circuit for controlling the water flow, and said solenoid valve being responsive to said third control circuit so as to be non-responsive to said second control circuit for said predetermined period of shut-off.

4. The system of claim 1, including a solenoid valve and wherein said third circuit includes a range control for permitting said second control circuit to operate for a period duration within a predetermined range of a preselected quantity of seconds, and an automatic shutdown for rendering said sensor and said solenoid valve inoperative for said predetermined period to stop and prevent the flow of water after said period duration of operation within the range of said preselected quantity of seconds.

5. The system of claim 1, wherein said sensor includes molded plastic filter holders for receiving and holding the infrared plastic filters, said holders and plastic filters have cooperative elements to permit said filters to be easily snapped into and removed from said filter holders.

6. The system of claim 1, including at least two separate fixtures, a water supply means for each said fixture, a sensor for each said separate water supply means and means for controlling the pulse rate of said infrared sensors in an installation having more than one fixture each with its individual water supply means with one of said sensors associated with each said fixture to prevent one sensor rendering another sensor in the same location activated to render another fixture operative to cause said water supply means to supply water.

7. The system of claim 1, for use with at least two fixtures, including a solenoid valve associated with and controlling said water supply means, means externally of each said fixture including said water supply means for water flow and internal or isolated means associated with each said fixture internally isolated from public access to control water flow by said fixture, said external means including said sensor, and said internal or isolated means including override circuitry connected with said solenoid valve placed into said water supply means to control the flow of water in said water supply means.

8. A system for controlling the flow of water, including a sensor circuit, a water supply unit, and a shut-off valve; said sensor circuit including:
 a power supply having a conventional A.C. source input and an output supplying filtered D.C. power, an A.C. sample, and unfiltered A.C. power;
 a power line phase synchronization detector circuit having its input coupled to said power supply for receiving said A.C. sample and an output;
 a capacitive discharge L.E.D. driver having two inputs and a single output;
 a transmitter including an L.E.D. coupled to said capacitive discharge single output for supplying an infrared energy signal through an infrared transmitting filter;
 a photosensor circuit including a photodiode sensor and high gain amplifier means for amplifying a received infrared signal, reflected from an object on which said infrared signal impinged during a sample period and reflected from the object after being transmitted from said L.E.D., said L.E.D consistently sampling at the same time with respect to zero voltage crossing of the A.C. power source, said photosensor circuit providing for a high degree of rejection of extraneous pulsing line powered light sources;
 a gated relative comparator circuit coupled to said high gain amplifier means and to said power line synchronization detector circuit controlling the duration of the sample period during which the output of said high gain amplifier means is sampled;
 an output conditioning circuit coupled to said gated relative comparator to provide a signal output when an object is detected in the path of said transmitted signal within a preselected distance from said transmitter; and
 an interface circuit coupled to said output conditioning circuit for converting an "on-off" signal to the components.

9. The system of claim 8, including:
 a range adjustment circuit having its input coupled to the output of said power line phase synchronization circuit and a dual output, one of said dual outputs being coupled to said L.E.D. driver;
 said power line phase synchronization circuit providing as said output thereof a precisely phased pulse output to trigger said range adjustment circuit to render said L.E.D. driver operative to activate said L.E.D. diode to transmit an infrared ray during a sample period, the duration of the pulse of current supplied to said L.E.D. being three to five microseconds;
 said gated relative comparator being coupled to and having one of its inputs derived from said range adjustment circuit, the range at which an object's presence is detected being proportional to the duration of the sample period and the distance from said transmitter; and
 said gated relative comparator being gated off except while sampling to prevent extraneous operation from high intensity fluorescent mercury vapor or high intensity sodium lamps, hysteresis insuring that said gated relative comparator remains off once the sample period begins, and when a predetermined change in signal occurs said gated relative comparator goes on and hysteresis keeps it on.

10. The system of claim 8, wherein said synchronous detector is synchronous with both said A.C. power line and the L.E.D. pulse, said L.E.D. pulse being very brief with respect to the period of the A.C. line and being pulsed once every 16.7 milliseconds.

11. The system of claim 9, wherein said high gain amplifier means includes a first high gain amplifier having its input capacitively coupled to said photodiode sensor through a low load resistance and a low value coupling capacitor, a second high gain amplifier coupled to said first high gain amplifier through a coupling capacitance to provide some rejection of 50–60 Hz light noise, and a third high gain amplifier having its input coupled to said second high gain amplifier and its output coupled to said gated relative comparator.

12. The system of claim 1, wherein said predetermined period of time delay varies between 0.5 to 0.8 seconds.

13. The system of claim 1, wherein said predetermined period of water flow time varies between 25 to 35 seconds.

14. The system of claim 1, wherein said second control circuit is not rendered operable for said predetermined period of time delay after water flow is shut off and which varies between 0.5 to 0.8 seconds, and said predetermined period of water flow time varies between 25 to 35 seconds.

* * * * *